(12) United States Patent
Parsons et al.

(10) Patent No.: US 7,158,845 B2
(45) Date of Patent: Jan. 2, 2007

(54) MAN-MACHINE INTERFACE FOR MONITORING AND CONTROLLING A PROCESS

(75) Inventors: Richard Parsons, Phoenix, AZ (US); Deana R. Delp, Tempe, AZ (US)

(73) Assignee: Tokyo Electron Limited, Tokyo (JP)

( * ) Notice: Subject to any disclaimer, the term of this patent is extended or adjusted under 35 U.S.C. 154(b) by 36 days.

(21) Appl. No.: 10/493,470

(22) PCT Filed: Oct. 31, 2002

(86) PCT No.: PCT/US02/31608

§ 371 (c)(1),
(2), (4) Date: Jul. 1, 2004

(87) PCT Pub. No.: WO03/038729

PCT Pub. Date: May 8, 2003

(65) Prior Publication Data

US 2004/0236451 A1    Nov. 25, 2004

Related U.S. Application Data

(60) Provisional application No. 60/330,787, filed on Oct. 31, 2001.

(51) Int. Cl.
*G06F 19/00*     (2006.01)

(52) U.S. Cl. .................... 700/96; 700/83; 700/222; 702/188; 715/736

(58) Field of Classification Search ................ 700/96, 700/108, 117, 121, 83, 143, 174, 222; 702/188; 715/736
See application file for complete search history.

(56) References Cited

U.S. PATENT DOCUMENTS 5,552,016 A * 9/1996 Ghanayem ............. 156/345.25
6,122,565 A * 9/2000 Wenning et al. ............ 700/206
6,147,601 A    11/2000 Sandelman et al.

* cited by examiner

*Primary Examiner*—Leo Picard
*Assistant Examiner*—Sheela S. Rao
(74) *Attorney, Agent, or Firm*—Oblon, Spivak, McClelland, Maier & Neustadt, P.C.

(57) ABSTRACT

A process monitoring system (100) for monitoring a plasma processing system. The process monitoring system (100) includes a plurality of processing subsystems (120), and a control system (110) coupled to the processing subsystems (120). The control system (110) is configured to receive monitor data from the processing subsystems (120) and send control data to the processing subsystems (120). The process monitoring system (100) also includes an external interface (140) coupled to the control system (110), where the external interface (140) includes a paging system. The process monitoring system further includes a man-machine interface (MMI) coupled to the control system (110). The MMI is configured to display the monitor data, display the control data, and access the paging system.

29 Claims, 10 Drawing Sheets

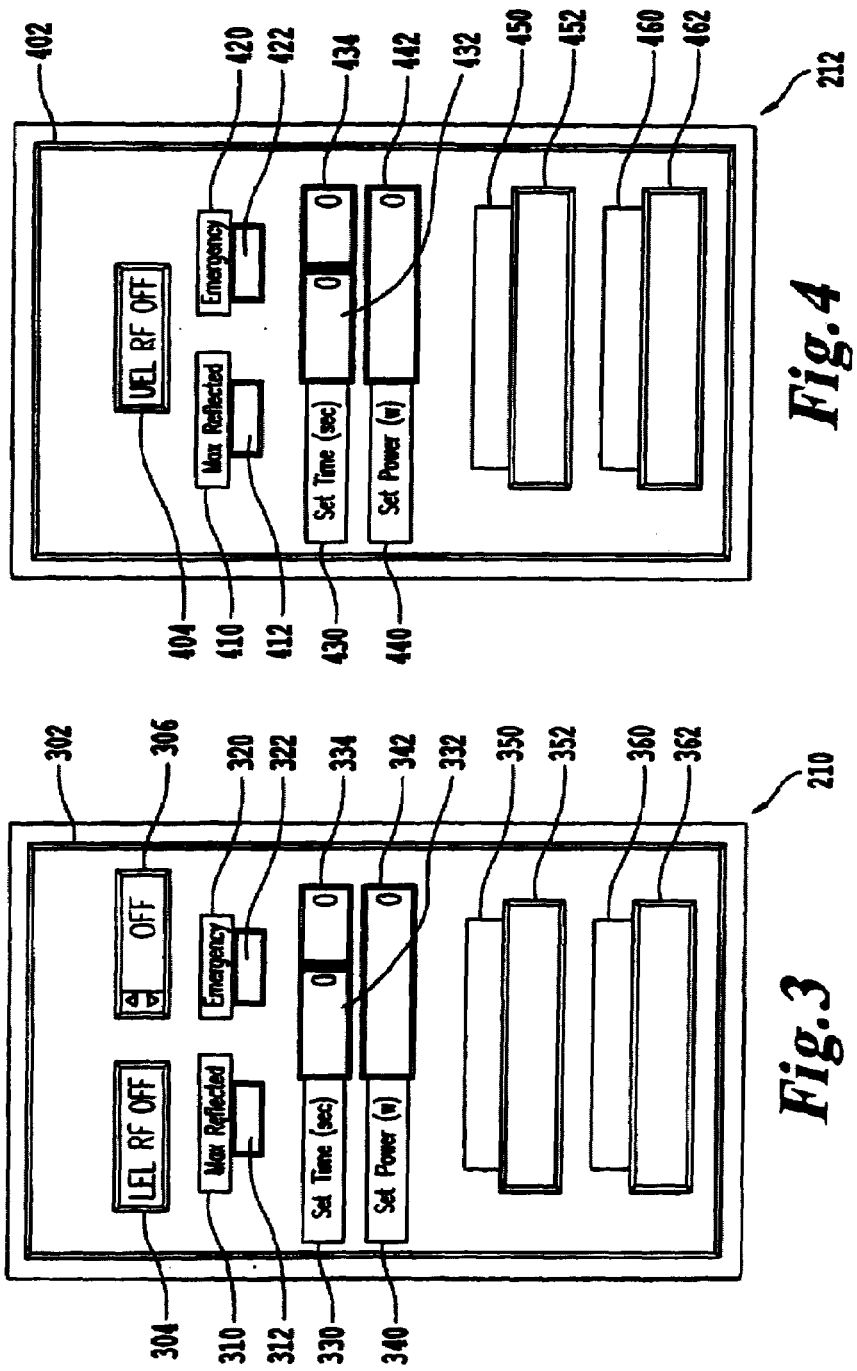

MAN-MACHINE INTERFACE FOR MONITORING AND CONTROLLING A PROCESS

CROSS-REFERENCE TO RELATED APPLICATION

This application claims priority to U.S. provisional Ser. No. 60/330,787, filed on Oct. 31, 2001, the entire contents of which are herein incorporated by reference.

BACKGROUND OF THE INVENTION

1. Field of the Invention

The present invention relates generally to a method and apparatus for monitoring and controlling a processing system used in a semiconductor fabrication process.

2. Background of the Invention

Semiconductor-processing tools are time consuming and expensive to maintain. Additionally, inefficient monitoring of a process tool can result in tool downtime that adds to the overall operational costs of the equipment.

Generally, tool control is performed by a number of different control systems having a variety of controllers. Some of the control systems have man-machine interfaces (or MMIs) such as touch panel displays, while others only display readings such as temperature. Process monitoring is usually time consuming and typically requires manual entry of data, as well as, recording and responding to problems. Oftentimes, the response time for dealing with problems is lengthened because of a lack of data or a lack of personnel trained to respond to a particular problem. This can lead to significant tool down time and a subsequent loss of processing time.

SUMMARY OF THE INVENTION

The present invention advantageously provides a method and apparatus for monitoring a semiconductor-processing tool to reduce processing tool downtime.

In one aspect of the invention, a process monitoring system for monitoring a plasma processing system is provided that includes a control system coupled to the plasma processing system. The control system receives monitor data from the plasma processing system and sends control data to the plasma processing system. The process monitoring system also includes an external interface coupled to the control system, where the external interface receives monitor data from the control system and sends control data to the control system. The process monitoring system further includes a man-machine interface (MMI) coupled to the control system. The MMI displays the monitor data and the control data, and accesses the external interface.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

A more complete appreciation of the invention and many of the attendant advantages thereof will become readily apparent with reference to the following detailed description, particularly when considered in conjunction with the accompanying drawings, in which:

FIG. 3 shows an expanded view of the first operational status GUI panel;

FIG. 4 shows an expanded view of the second operational status GUI panel;

DETAILED DESCRIPTION OF THE PREFERRED EMBODIMENTS

Figure 1:
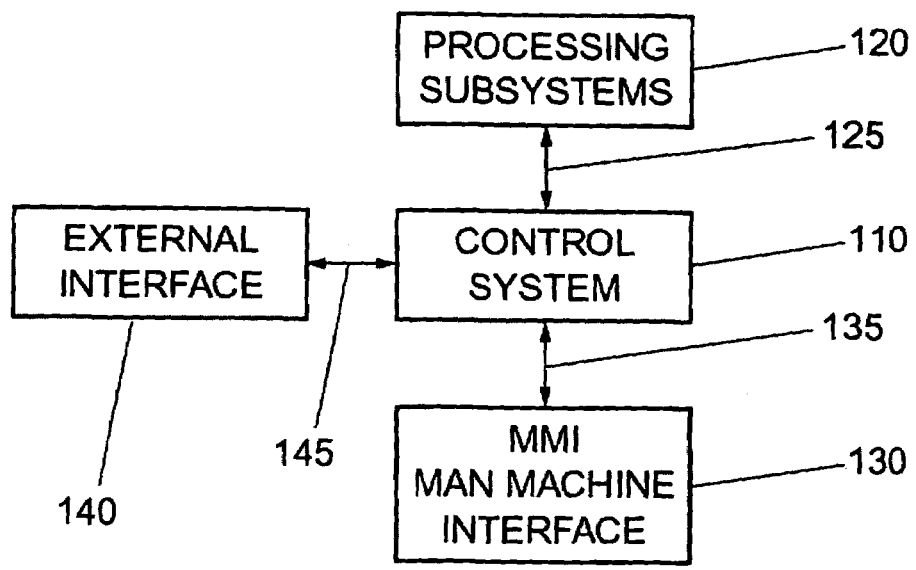
FIG. 1 is a simplified block diagram showing a system for monitoring and controlling a processing system according to a preferred embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 is a simplified block diagram showing a system for monitoring and controlling a processing system according to a preferred embodiment of the present invention. The processing system 100 includes a control system 110, a plurality of processing subsystems 120, a man-machine interface (or MMI) 130, and an external interface 140. Control system 110 is coupled to one or more processing subsystem 120, MMI 130, and external interface 140. Control system 110 includes software and hardware for communicating via path 125 with processing subsystems 120, for communicating via path 135 with MMI 130, and for communicating via path 145 with external interface 140.

In a preferred embodiment, the processing subsystems 120 generally include one or more plasma processing tool, one or more gas box tool, and one or more radio frequency (or RF) source, which are generally known to those of skill in the art. The processing subsystems also generally include a plurality of control elements and monitor elements. For example, the control elements can include valves, mass flow regulators, pumps, RF sources, and matching networks, which are generally known to those of skill in the art. Additionally, the monitor elements can include RF source sensors, temperature sensors, pressure sensors, gas system sensors, processing tool sensors, and alarm indicators, which are generally known to those of skill in the art.

Control system 110 includes hardware and software elements (not shown) for interfacing with the plurality of control elements and monitor elements in the processing subsystems 120. For example, the hardware can include a computer, memory, video display, mouse and keyboard, and the software can include an operating system.

In a preferred embodiment, the control system 110 includes a Virtual Private Network (or VPN). Desirably, the VPN allows multiple nodes to operate in parallel and allows for the physical separation of nodes. For example, a node can include a subsystem controlled by an embedded microcontroller. Also, a node can include a control computer in a cleanroom or a client computer outside a cleanroom.

Desirably, the control system 110 also includes a database for collecting the monitored data and status data from the processing subsystems 120. In a preferred embodiment, the database is a Structured Query Language (or SQL) database and additional memory space is provided for the SQL database. The control system 110 includes means to read from the database and to write to the database.

In a preferred embodiment, the control system 110 includes MMI software for controlling the MMI 130. MMI 130 includes a graphical user interface (or GUI) screen for controlling and monitoring one or more plasma processing tool of the processing subsystems 120 and a GUI screen for controlling and monitoring one or more gas supply system associated with the one or more plasma processing tool. The GUI screens are easily readable status displays and control interfaces for use with the control system and the processing subsystems. Visible warning signals are present on the GUI screens, and interlocks are provided by the MMI software. In addition, MMI 130 includes input devices, such as a touchscreen, a mouse, and/or a keyboard.

The MMI software communicates through one or more computer in the control system 110 to the processing subsystems 120, which control the plasma process. The MMI 130 is setup with independent MMI software modules for control of the gas box and tool. The graphical display of the MMI 130 is also controllable from outside the clean room via the control computer in the control system 110. The MMI software and GUI screens are accessible through the VPN.

In a preferred embodiment, the MMI 130 includes software that is installed onto one or more computers in a network of computational resources. Desirably, the installation of the software on a computer causes an icon to be displayed on the computer's display. For example, double-clicking the icon can cause the software to begin executing to provide the GUI. Desirably, a login screen is displayed, and the login screen is used to control access to the MMI 130.

The external interface 140 receives monitor data from the control system 110 and provides this monitor data to one or more external user. In addition, external interface 140 receives control data from one or more external user and sends this control data to the control system 110.

In a preferred embodiment, the external interface 140 includes a dial-in service. The dial-in service allows a user to access the database in the control system 110 via a telephone line and provides limited access to the data in database. Desirably, the dial-in service requires the user to input a pin number before gaining access. For example, when a correct pin number has been entered, the caller can hear the current status for one or more of the processing subsystems 120. In alternate embodiments, the pin numbers can be used to provide different menus to different users. For example, various menus can be used to provide status data in different formats.

In a preferred embodiment, the external interface 140 further includes a one-way paging service or system. The paging service allows users to be notified via wireless devices having receiving capabilities. For example, a wireless device can be a one-way pager, a cellular phone, or other computing device having a wireless receiver and display. The one-way paging service provides the user with a limited amount of data from the database in the control system 110 via a wireless connection. Desirably, a manager's pager is sent a first set of messages, a process engineer's pager is sent a second set of messages, and a process technician's pager is sent a third set of messages.

In an alternate embodiment, external interface 140 further includes a two-way paging service or system. The two-way paging service can allow users to be notified via wireless devices having receiving and transmitting capabilities. For example, a wireless device can be a two-way pager, a cellular phone, or other computing device having a wireless receiver, transmitter, user interface, and display. The two-way paging service can provide the user with a limited amount of data from the database in the control system 110 via a wireless connection and can provide limited access to the data in the database. Desirably, the two-way paging service requires the user to input a pin number before gaining access. For example, when a correct pin number has been entered, the user could receive status information and send a reply message.

Figure 2:
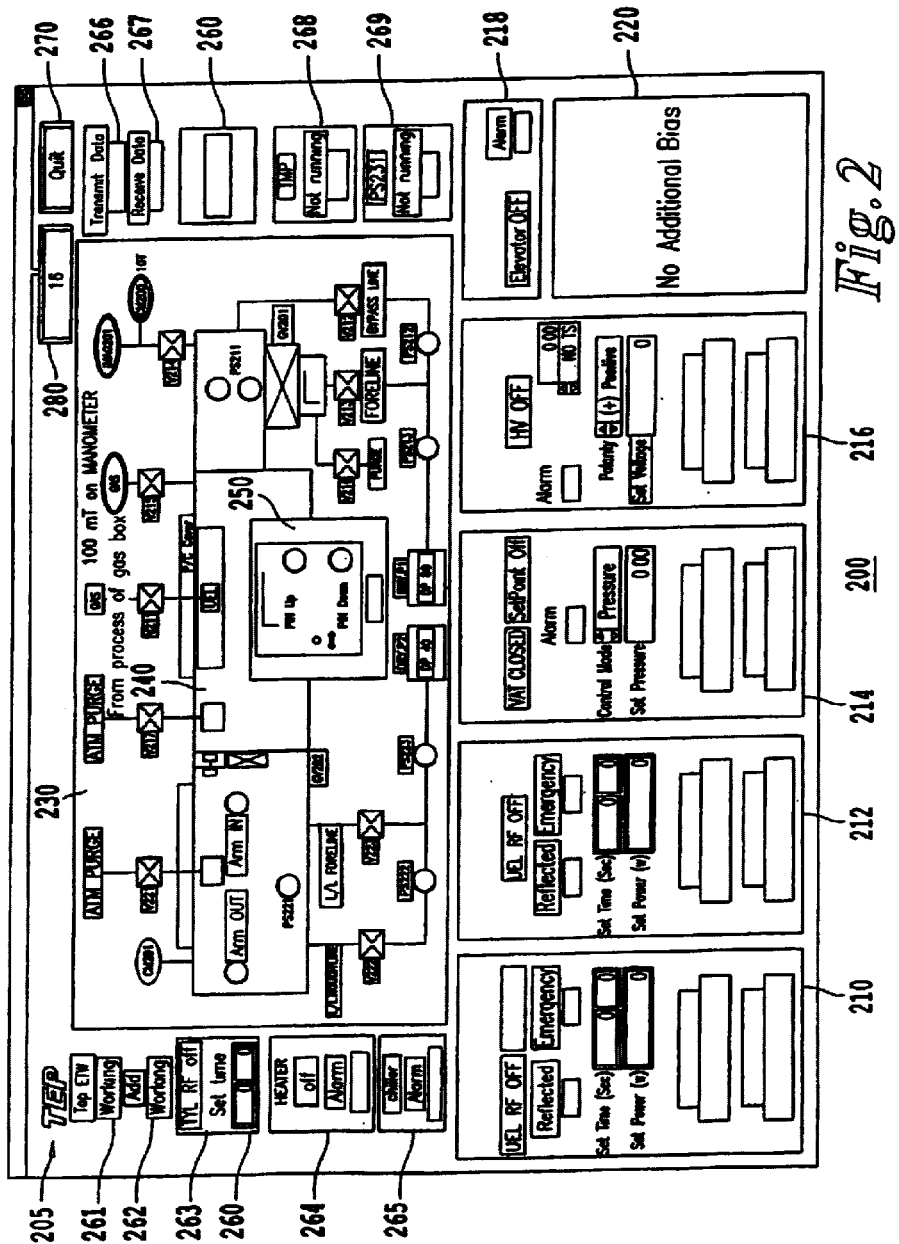
FIG. 2 illustrates a simplified view of a graphical user interface (or GUI) screen for controlling and monitoring a first subsystem in accordance with a preferred embodiment of the present invention.

FIG. 2 illustrates a simplified view of a GUI screen for controlling and monitoring a first subsystem of the processing subsystems 120 in accordance with a preferred embodiment of the present invention. In a preferred embodiment, a tool control GUI screen 200 is provided to the operator for monitoring and controlling a plasma-processing tool. In alternate embodiments, a tool control GUI screen can also be provided to a monitoring site. For example, tool control GUI screen can be provided to supervisory personnel.

A company logo GUI panel 205 provides a visual reminder about the company providing the screen display. In the illustrated embodiment, logo GUI panel 205 provides only a company logo. In alternate embodiments, logo GUI panel 205 can be dynamic and provide the operator with additional information when the operator selects the logo GUI panel 205. For example, the logo GUI panel 205 can provide contact information and/or version information.

First operational status GUI panel 210 provides a visual indication of the current operational status of a set of control elements and monitor elements associated with a first system component. In the illustrated embodiment, GUI panel 210 displays data associated with a first RF subsystem.

Second operational status GUI panel 212 provides a visual indication of the current operational status of a set of control elements and monitor elements associated with a second system component. In the illustrated embodiment, GUI panel 212 displays data associated with a second RF subsystem.

Third operational status GUI panel 214 provides a visual indication of the current operational status of a set of control elements and monitor elements associated with a third system component. In the illustrated embodiment, GUI panel 214 displays data associated with a gate valve.

Fourth operational status GUI panel 216 provides a visual indication of the current operational status of a set of control elements and monitor elements associated with a fourth system component. In the illustrated embodiment, GUI panel 216 displays data associated with an electrostatic chuck voltage.

Fifth operational status GUI panel 218 provides a visual indication of the current operational status of a set of control elements and monitor elements associated with a fifth system component. In the illustrated embodiment, GUI panel 218 displays data associated with a chuck.

Sixth operational status GUI panel 220 provides a visual indication of the current operational status of a set of control elements and monitor elements associated with a sixth system component. In the illustrated embodiment, GUI panel 220 displays data associated with a third RF source.

Seventh operational status GUI panel 230 provides a visual indication of the current operational status of a set of control elements and monitor elements associated with a seventh system component. In the illustrated embodiment, GUI panel 230 displays data associated with a gas supply system and an exhaust system.

Eighth operational status GUI panel 240 provides a visual indication of the current operational status of a set of control elements and monitor elements associated with an eighth system component. In the illustrated embodiment, GUI panel 240 displays data associated with a load lock chamber and a process chamber.

Ninth operational status GUI panel 250 provides a visual indication of the current operational status of a set of control elements and monitor elements associated with a ninth system component. In the illustrated embodiment, GUI panel 250 displays data associated with a chuck.

Tool control GUI screen 200 includes a plurality of additional controls 260. As shown in FIG. 2, additional controls 260 include a company logo GUI panel 205, a first monitor GUI panel 261, a second monitor GUI panel 262, a TYL RF GUI panel 263, a heater GUI panel 264, and a chiller GUI panel 265. Furthermore, additional controls 260 include a transmit data monitor GUI panel 266, a receive data monitor GUI panel 267, a TMP GUI panel 268, and a pressure switch monitor GUI panel 269.

First monitor GUI panel 261 provides a visual indication of the operational status of one or more RF source. In the illustrated embodiment, this GUI panel displays the status for the top and bottom RF sources. For example, "working" and "not-working" are used to display RF source status.

Second monitor GUI panel 262 provides a visual indication of the operational status of one or more additional RF source. In the illustrated embodiment, this GUI panel displays the status for an additional RF source controlled via GUI panel. For example, "working" and "not-used" are used to display RF source status.

TYL RF GUI panel 263 provides a manual control feature for one or more RF source and a visual indication of the manually selected parameters for the one or more RF source. In the illustrated embodiment, this GUI panel allows manual control of frequency, power, and time.

Heater control GUI panel 264 is used to control and/or monitor one or more heater used during the plasma process. In the illustrated embodiment, heater control GUI panel provides an "ON/OFF" control button, an alarm indicator, and a status display for a single heater. In alternate embodiments, this heater control GUI panel can provide an "ON/OFF" controls, alarm indicators, and status displays for more than one heater.

Chiller control GUI panel 265 is used to control and/or monitor one or more chiller used during the plasma etching process. In the illustrated embodiment, chiller control GUI panel provides an alarm indicator, and a status display for a single chiller. In alternate embodiments, chiller control GUI panel can provide an "ON/OFF" controls, alarm indicators, and status displays for more than one chiller.

Transmit data monitor GUI panel 266 provides a visual indication of the operational status of one or more data transmission from the MMI software to one or more controller in a subsystem, such as the processing tool. For example, data can be transmitted to an embedded microcontroller.

Receive data monitor GUI panel 267 provides a visual indication of the operational status of one or more data transmission to the MMI software from one or more controller in a subsystem, such as the processing tool. For example, data can be received from an embedded microcontroller.

TMP GUI panel 268 provides a visual indication of the operational status of one or more pump. In the illustrated embodiment, TMP GUI panel displays the status for a turbomolecular pump (or TMP). For example, "running" and "not-running" are used to display pump status.

Pressure switch GUI panel 269 provides a visual indication of the operational status of one or more pressure switch (or PS). In the illustrated embodiment, pressure switch panel displays the status for one or more pressure switch. For example, "running" and "not-running" are used to display pump status.

A quit button 270 provides a user with a means for closing the GUI screen currently being displayed.

A page button 280 provides a user with a means for sending a page to a pager. In a preferred embodiment, a drop-down list of pagers is provided, and the user selects one or more pagers from the list. Pages are sent to the selected pagers.

FIG. 3 shows an expanded view of the first operational status GUI panel 210. In the illustrated embodiment, first operational status GUI panel 210 displays data associated with a first system component of the first subsystem of the processing subsystems 120. First operational status GUI panel 210 displays a visual indication of the current operational status of a set of control elements and monitor elements associated with a first system component. In the illustrated embodiment, GUI panel 210 displays data associated with a Lower Electrode (or LEL) and the RF power being supplied to the LEL.

The first system component name associated with the GUI panel 210 is shown in display area 302, which in this case is "2 MHz LEL RF." The current status for the RF source, which is supplying power to LEL, is shown in display area 304. For example, the displayed status for this RF source can be "LEL RF OFF," "ULEL RF SBY" (i.e. standby status), and "LEL RF ON." Desirably, the user controls the status of the RF source by selecting the correct state. Alternately, the software can control the status of the RF source, and the current status is displayed for the user to view. The RF source status is displayed in display area 306.

A first monitored parameter is displayed in display area 310. For example, the first monitored parameter can be "Max Reflected" power or the user can select another name from a drop-down list. The value for the first monitored parameter is displayed in display area 312. A second monitored parameter is displayed in display area 320. For example, the second monitored parameter can be used to monitor an "Emergency" condition. The value for the second monitored parameter is displayed in display area 322.

A first controlled parameter is displayed in display area 330. For example, the first controlled parameter can be entitled "Set Time." The current input value for the first controlled parameter is displayed in display area 332, and the time remaining value is displayed in display area 334. A second controlled parameter is displayed in display area 340. For example, the second controlled parameter can be used to set a "Power" level. The current input value for the second controlled parameter is shown in display area 342. In a preferred embodiment, the operator can change these controlled parameters. Alternately, the operator is not allowed to change these controlled parameters, but can view the current input value.

A third monitored parameter is shown in display area 350. For example, the third monitored parameter can be entitled "Incident" power. The value for the third monitored parameter is shown in display area 352. A fourth monitored parameter is shown in display area 360. For example, the fourth monitored parameter can be entitled "Reflected" power. The value for the fourth monitored parameter is shown in display area 362.

FIG. 4 shows an expanded view of the second operational status GUI panel 212. In the illustrated embodiment, second operational status GUI panel 212 displays data associated with a second component of the first subsystem of the processing subsystems 120. Second operational status GUI panel 212 displays a visual indication of the current operational status of a set of control elements and monitor elements associated with a second system component. In the illustrated embodiment, GUI panel 212 displays data associated with an Upper Electrode (or UEL) and the RF power being supplied to the UEL.

The second system component name associated with the GUI panel 212 is shown in display area 402, which in this case is "60 MHz UEL RF." The current status for the RF source, which is supplying power to UEL, is shown in display area 404. For example, the displayed status for this RF source can be "UEL RF OFF," "UEL RF SBY," and "UEL RF ON." Desirably, the user controls the status of the RF source by selecting the correct state. Alternately, the software can control the status of the RF source, and the current status is displayed for the user to view.

A first monitored parameter is displayed in display area 410. For example, the first monitored parameter can be "Max Reflected" power or the user can select another name from a drop-down list. The value for the first monitored parameter is displayed in display area 412. A second monitored parameter is displayed in display area 420. For example, the second monitored parameter can be used to monitor an "Emergency" condition. The value for the second monitored parameter is displayed in display area 422.

A first controlled parameter is displayed in display area 430. For example, the first controlled parameter can be entitled "Set Time." The current input value for the first controlled parameter is displayed in display area 432, and the time remaining value is displayed in display area 434. A second controlled parameter is displayed in display area 440. For example, the second controlled parameter can be used to set a "Power" level. The current input value for the second controlled parameter is shown in display area 442. In a preferred embodiment, the operator can change these controlled parameters. Alternately, the operator is not allowed to change these controlled parameters, but can view the current input value.

A third monitored parameter is shown in display area 450. For example, the third monitored parameter can be entitled "Incident" power. The value for the third monitored parameter is shown in display area 452. A fourth monitored parameter is shown in display area 460. For example, the fourth monitored parameter can be entitled "Reflected" power. The value for the fourth monitored parameter is shown in display area 462.

Figure 5:
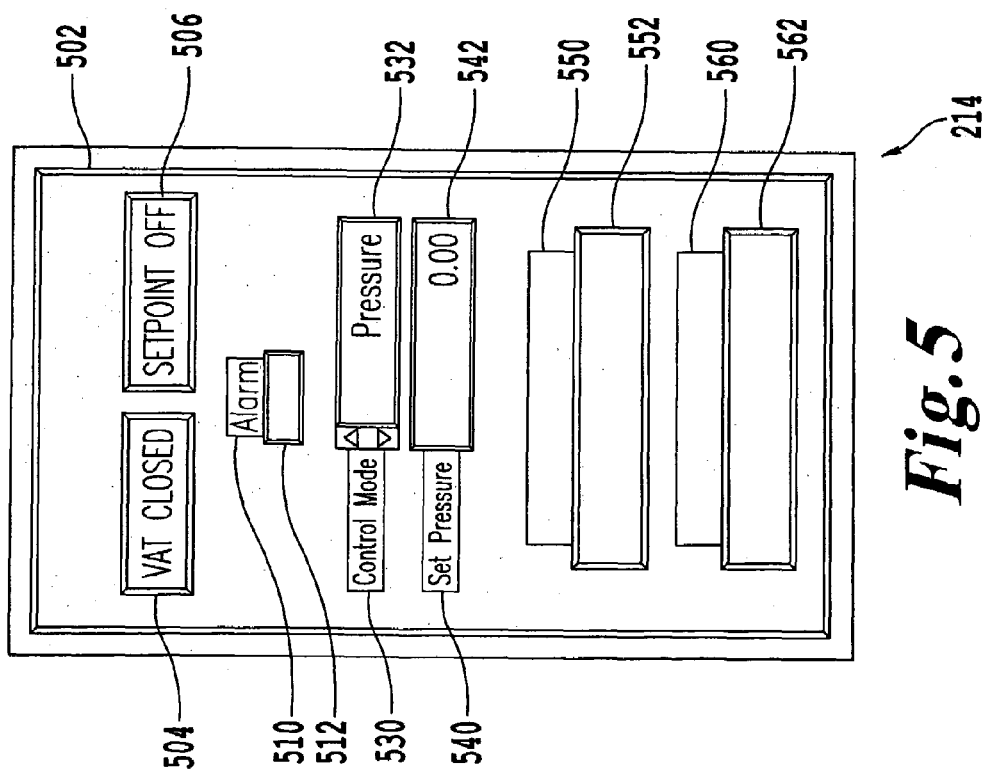
FIG. 5 shows an expanded view of the third operational status GUI panel.

FIG. 5 shows an expanded view of the third operational status GUI panel 214. In the illustrated embodiment, third operational status GUI panel 214 displays data associated with a third component of the first subsystem of the processing subsystems 120. Third operational status GUI panel 214 displays a visual indication of the current operational status of a set of control elements and monitor elements associated with a third system component of the processing subsystems 120. In the illustrated embodiment, GUI panel 214 displays data associated with a gate valve.

The third system component name associated with the GUI panel 214 is shown in display area 502, which in this case is "VAT VALVE GV201." The current status for this gate valve is shown in display area 504. For example, the displayed status for this gate valve can be "VAT CLOSED" and "VAT OPEN." The current status for the process controlling this gate valve is shown in display area 506. For example, the displayed status for this process can be "Setpoint OFF" and "Setpoint ON." Desirably, the user controls the status of the gate valve by selecting the correct state. Alternately, the software can control the status of the gate valve, and the current status is displayed for the user to view.

A first monitored parameter is displayed in display area 510. For example, the first monitored parameter can be an "Alarm" condition or the user can select another option from a drop-down list. The value for the first monitored parameter is displayed in display area 512.

A first controlled parameter is displayed in display area 530. For example, the first controlled parameter can be entitled "Control Mode." The current input value for the first controlled parameter is displayed in display area 532. For example, the first controlled parameter can be entitled "Pressure." A second controlled parameter is displayed in display area 540. For example, the second controlled parameter can be used to set "Set Pressure." The current input value for the second controlled parameter is shown in display area 542. In a preferred embodiment, the operator can change these controlled parameters. Alternately, the operator is not allowed to change these controlled parameters, but can view the current input value.

A third monitored parameter is shown in display area 550. For example, the third monitored parameter can be entitled "Current Pressure." The value for the third monitored parameter is shown in display area 552. A fourth monitored parameter is shown in display area 560. For example, the fourth monitored parameter can be entitled "VAT Valve Position." The value for the fourth monitored parameter is shown in display area 562.

Figure 6:
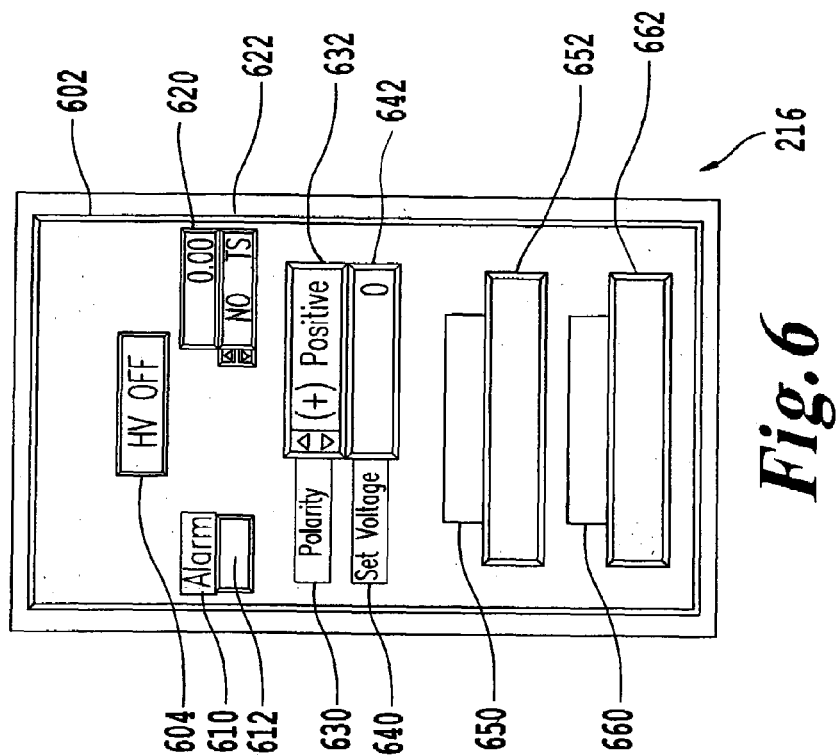
FIG. 6 shows an expanded view of the fourth operational status GUI panel.

FIG. 6 shows an expanded view of the fourth operational status GUI panel 216. In the illustrated embodiment, fourth operational status GUI panel 216 displays data associated with a fourth system component of the first subsystem of the processing subsystems 120. Fourth operational status GUI panel 216 displays a visual indication of the current operational status of a set of control elements and monitor elements associated with a fourth system component of the processing subsystems 120. In the illustrated embodiment, GUI panel 216 displays data associated with a high voltage power supply.

The fourth system component name associated with the GUI panel 216 is shown in display area 602, which in this case is "ESC VOLTAGE." The current status for the high voltage power supply is shown in display area 604. For example, the displayed status for this high voltage power supply can be "HV OFF," "HV SBY," and "HV ON." Desirably, the user controls the status of the high voltage power supply by selecting the correct state. Alternately, the software can control the status of the high voltage power supply, and the current status is displayed for the user to view.

A first monitored parameter is displayed in display area 610. For example, the first monitored parameter can be an "Alarm." The value for the first monitored parameter is displayed in display area 612. A second monitored parameter is displayed in display area 620. For example, the second monitored parameter can be used to monitor the time left in a timing sequence. The value for the second monitored parameter is displayed in display area 622. For example, display area 622 can be used to timing sequence status.

A first controlled parameter is displayed in display area 630. For example, the first controlled parameter can be entitled "Polarity." The current input value for the first controlled parameter is displayed in display area 632. A second controlled parameter is displayed in display area 640. For example, the second controlled parameter can be used to "Set Voltage." The current input value for the second controlled parameter is shown in display area 642. In a preferred embodiment, the operator can change these controlled parameters. Alternately, the operator is not allowed to change these controlled parameters, but can view the current input value.

A third monitored parameter is shown in display area 650. For example, the third monitored parameter can be entitled "Voltage." The value for the third monitored parameter is shown in display area 652. A fourth monitored parameter is shown in display area 660. For example, the fourth monitored parameter can be entitled "Current." The value for the fourth monitored parameter is shown in display area 662.

Figure 7:
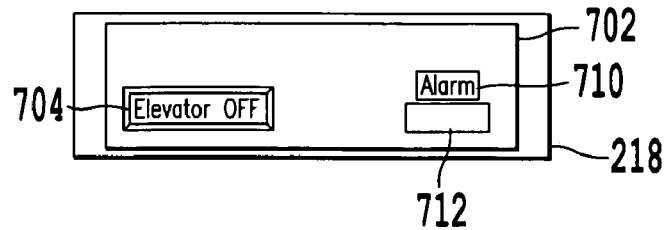
FIG. 7 shows an expanded view of the fifth operational status GUI panel.

FIG. 7 shows an expanded view of the fifth operational status GUI panel 218. In the illustrated embodiment, fifth operational status GUI panel 218 displays data associated with a fifth system component of the first subsystem of the processing subsystems 120. Fifth operational status GUI panel 218 displays a visual indication of the current operational status of a set of control elements and monitor elements associated with a fifth system component of the processing subsystems 120. In the illustrated embodiment, GUI panel 218 displays data associated with a chuck elevator.

The fifth system component name associated with the GUI panel 218 is shown in display area 702, which in this case is "CHUCK ELEVATOR." The current status for the chuck elevator is shown in display area 704. For example, the displayed status for this chuck elevator can be "Elevator OFF" and "Elevator ON." Desirably, the user controls the status of the chuck elevator by selecting the correct state. Alternately, the software can control the status of the chuck elevator, and the current status is displayed for the user to view.

A first monitored parameter is displayed in display area 710. For example, the first monitored parameter can be an "Alarm." The value for the first monitored parameter is displayed in display area 712.

Figure 8:
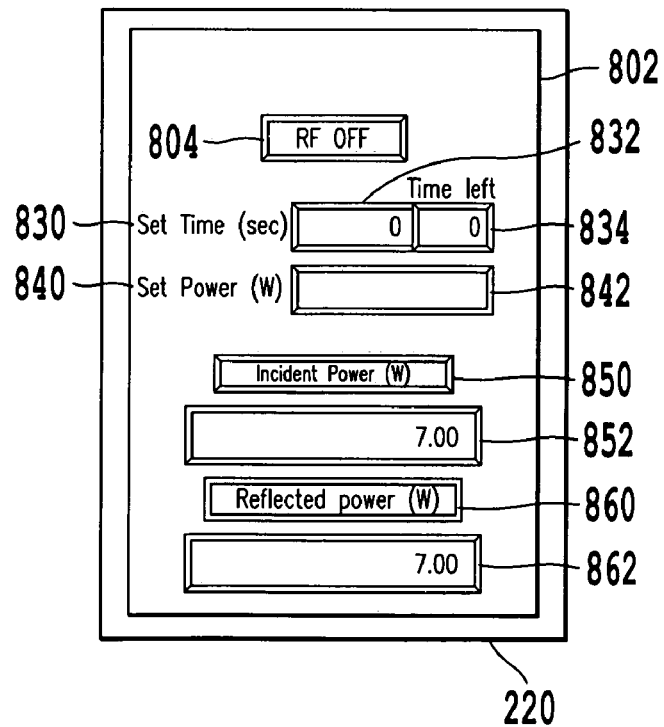
FIG. 8 shows an expanded view of the sixth operational status GUI panel.

FIG. 8 shows an expanded view of the sixth operational status GUI panel 220. In the illustrated embodiment, sixth operational status GUI panel 220 displays data associated with a sixth system component of the first subsystem of the processing subsystems 120. The sixth operational status GUI panel 220 (FIG. 2) displays a visual indication of the current operational status of a set of control elements and monitor elements associated with a sixth system component of the processing subsystems 120. In the illustrated embodiment, GUI panel 220 displays data associated with another RF power source.

The sixth system component name associated with the GUI panel 220 is shown in display area 802 (FIG. 8), which in this case is "100 MHz RF." The current status for this other RF source is shown in display area 804. For example, the displayed status for this RF source can be "RF OFF," "RF SBY," and "RF ON." Desirably, the user controls the status of this other RF source by selecting the correct state. Alternately, the software can control the status of this other RF source, and the current status is displayed for the user to view.

A first controlled parameter is displayed in display area 830. For example, the first controlled parameter can be entitled "Set Time." The current input value for the first controlled parameter is displayed in display area 832, and the time left in a timing sequence is displayed in display area 834. A second controlled parameter is displayed in display area 840. For example, the second controlled parameter can be used to set a "Power" level. The current input value for the second controlled parameter is shown in display area 842. In a preferred embodiment, the operator can change these controlled parameters. Alternately, the operator is not allowed to change these controlled parameters, but can view the current input value.

A first monitored parameter is shown in display area 850. For example, the first monitored parameter can be entitled "Incident" power. The value for the first monitored parameter is shown in display area 852. A second monitored parameter is shown in display area 860. For example, the second monitored parameter can be entitled "Reflected" power. The value for the second monitored parameter is shown in display area 862.

Figure 9:
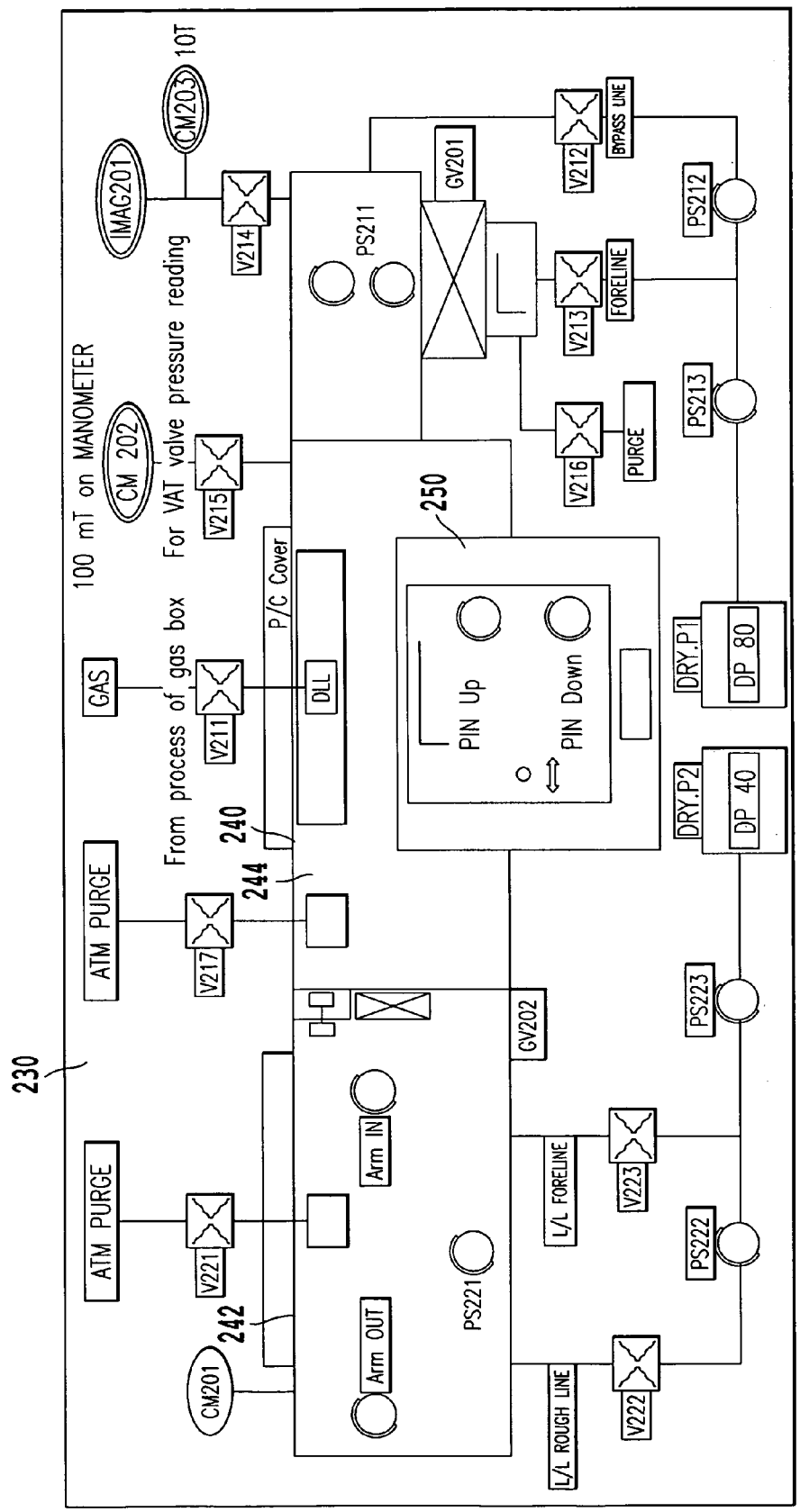
FIG. 9 shows an expanded view of the processing tool operational status GUI panel.

FIG. 9 shows an expanded view of the processing tool operational status GUI panels 230, 240, and 250 of the first subsystem of the processing subsystems 120. In the illustrated embodiment, the processing tool operational status GUI panels display data associated with a gas supply system and an exhaust system in GUI panel 230, a load/lock chamber (or L/L) 242 and a process chamber (or P/C) 244 in GUI panel 240, and a chuck in GUI panel 250. In addition, the processing tool operational status GUI panels 230, 240, and 250 illustrate a simplified schematic for the gas supply system, the exhaust system, the load/lock chamber, the process chamber, and the chuck.

In the illustrated embodiment, the gas supply system has a number of control elements V221, V217, V211, V215, and V214. These control elements are valves that are used to control the gases being supplied to the load/lock chamber 242 and the process chamber 244. In addition, the gas supply system has a number of monitor elements CM201, CM202, CM203, and IMAG201. These monitor elements are devices that are used to monitor the flow of the gases being supplied to the load/lock chamber 242 and the process chamber 244. Also, message boxes (ATM PURGE) are provided to indicate to the user various process conditions.

In the illustrated embodiment, the exhaust system has a number of control elements V222, V223, V216, V213, and V212. These control elements are valves that are used to control the exhausting of gases from the load/lock chamber 242 and the process chamber 244. In addition, the exhaust system has a number of monitor elements PS222, PS223, PS213, PS212, TMP, DRY P1, and DRY P2. These monitor elements are devices that are used to monitor the flow of the gases being exhausted from the load/lock chamber 242 and the process chamber 244. Also, message box (PURGE) is provided to indicate to the user various process conditions.

In the illustrated embodiment, the load/lock chamber 242 and the process chamber 244 have a number of control elements L/L Cover, Arm In, Arm Out, GV202, P/C Cover, UEL, Chuck Pin Lift, and GV201. These control elements are devices that are used to control the state of the load/lock chamber 242 and the process chamber 244. In addition, the load/lock chamber 242 and the process chamber 244 have a number of monitor elements PS221, and PS211. These monitor elements are devices that are used to monitor the state of the load/lock chamber 242 and the process chamber 244.

Figure 10:
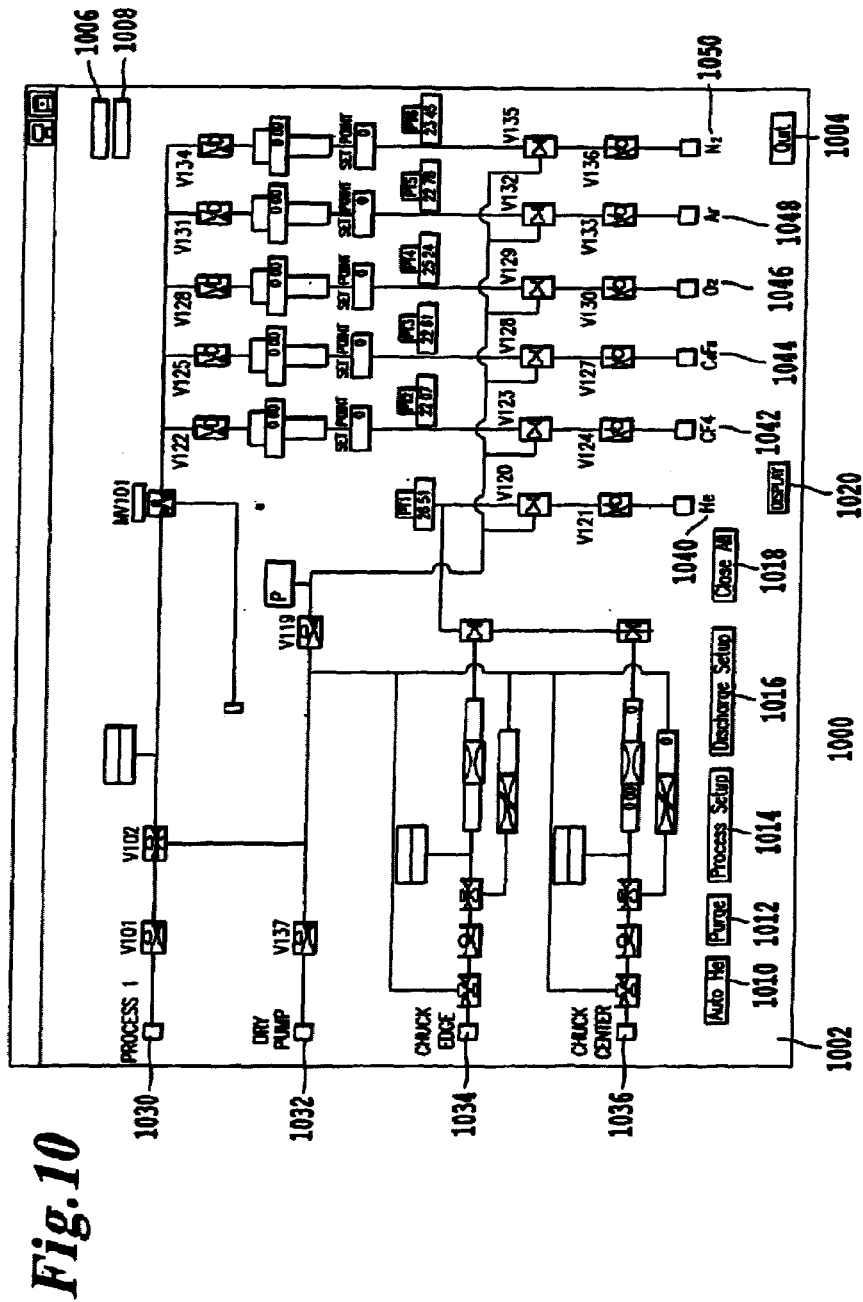
FIG. 10 illustrates a simplified view of a GUI screen for controlling and monitoring a second subsystem in accordance with a preferred embodiment of the present invention.

FIG. 10 illustrates a simplified view of a gas box control GUI for controlling and monitoring a second subsystem in accordance with a preferred embodiment of the present invention. Gas box control GUI 1000 includes a company logo GUI panel 1002, a control button 1004, a transmit data monitor GUI panel 1006, a receive data monitor GUI panel 1008, process control display GUI panels 1010, 1012, 1014, 1016, and 1018, gas destination point GUI panels 1030, 1032, 1034, and 1036, and gas supply GUI panels 1040, 1042, 1044, 1046, 1048, and 1050.

In the illustrated embodiment, process control display buttons 1010, 1012, 1014, 1016, and 1018 are labeled "Auto He," "Purge," "Process Setup," "Discharge Setup," and "Close All," respectively. A software driven process is initiated when one of these buttons is selected. For example, when "Auto He" is selected He is automatically provided to the backside of a wafer. In alternate embodiments, different software driven processes can be used.

Also, gas destination point GUI panels 1030, 1032, 1034, and 1036 are labeled "PROCESS 1," "Dry Pump," "Chuck Edge," and "Chuck Center," respectively. In alternate embodiments, different gas destination points can be used.

Also, gas supply GUI panels 1040, 1042, 1044, 1046, 1048, and 1050 are labeled "He," "CF4," "C4F8," "O2," "Ar," and "N2," respectively. In alternate embodiments, different gases can be used.

Valves (Vnnn) are control and monitor elements. For example, valves are controlled to be in one of two states and their color indicates the state that they are currently in.

Manometer 102, Manometer 103, and Manometer 106 are monitor elements and are used to display the pressure is a specific line.

Mass flow controllers MFC 101–MFC107 are also control and monitor elements. For example, MFCs can be used to set a desired flow rate and used to measure the actual flow rate.

Pressure transducers PT1–PT7 are used to monitor the pressure in specific lines.

Pressure control valves PCV102 and PCV103 are used to control the pressure in a specific line.

FIG. 10 illustrates a simplified view of a gas box control GUI in accordance with a preferred embodiment of the present invention. Gas box control GUI 1000 comprises company logo GUI panel 1002, control button 1004, transmit data monitor GUI panel 1006, receive data monitor GUI panel 1008, process control display GUI panels 1010–1018, gas process display 1020, gas destination point GUI panels 1030–1036, and gas supply GUI panels 1040–1050.

In the illustrated embodiment, process control display buttons 1010–1018 are labeled "Auto He", "Purge", "Process Setup", "Discharge Setup", and "Close All", respectively. A software driven process is initiated when one of these buttons is selected. For example, when "Auto He" is selected He is automatically provided to the backside of a wafer, and gas process display 1020 displays "Auto He". In alternate embodiments, different software driven processes can be used.

For example, during the "Stand-By" mode in an "Auto-He" process used to control He pressure for the wafer backside, the MMI software opens V137, V121, V117 and V116; sets the flow rate of MFC106 and MFC107 at, for example, 20 sccm; sets the pressure of PCV102 at, for example, 10 Torr; and sets the pressure of PCV103 at, for example, 30 torr. During the "Control" mode, the MMI software opens V110, V111 and waits for the pressure to stabilize.

As shown in FIG. 10, a second gas ($CF_4$) 1042 can be supplied to a first destination (PROCESS 1) 1030 using valves V124, V123, V122, V107, V101, and PT2 can be used to measure the pressure of this gas. Manometer 106 provides a pressure reading, and MFC 101 is used to control the flow of this gas. The second gas 1042 can also be supplied to a second destination (Dry Pump) 1032 using valves V124, V123, V119, V137, and PT7 can be used to measure the pressure.

A third gas ($C_4F_8$) 1044 can be supplied to a first destination (PROCESS 1) 1030 using valves V127, V126, V125, V107, V101, and PT3 can be used to measure the pressure of this gas. Manometer 106 provides a pressure reading, and MFC 102 is used to control the flow of this gas. The third gas 1044 can also be supplied to a second destination (Dry Pump) 1032 using valves V127, V126, V119, V137, and PT7 can be used to measure the pressure.

A fourth gas ($O_2$) 1046 can be supplied to a first destination (PROCESS 1) 1030 using valves V130, V129, V128, V107, V101, and PT4 can be used to measure the pressure of this gas. Manometer 106 provides a pressure reading, and MFC 103 is used to control the flow of this gas. The fourth gas 1046 can also be supplied to a second destination (Dry Pump) 1032 using valves V130, V129, V119, V137, and PT7 can be used to measure the pressure.

A fifth gas (Ar) 1048 can be supplied to a first destination (PROCESS 1) 1030 using valves V133, V132, V131, V107, V101, and PT5 can be used to measure the pressure of this gas. Manometer 106 provides a pressure reading, and MFC 104 is used to control the flow of this gas. The fifth gas 1048 can also be supplied to a second destination (Dry Pump) 1032 using valves V133, V132, V119, V137, and PT7 can be used to measure the pressure.

A sixth gas ($N_2$) 1050 can be supplied to a first destination (PROCESS 1) 1030 using valves V136, V135, V134, V107, V101, and PT6 can be used to measure the pressure of this gas. Manometer 106 provides a pressure reading, and MFC 105 is used to control the flow of this gas. The sixth gas 1050 can also be supplied to a second destination (Dry Pump) 1032 using valves V136, V135, V119, V137, and PT7 can be used to measure the pressure.

In a preferred embodiment, gas box control GUI 1000 is provided to the operator controlling the plasma-processing tool. In alternate embodiments, gas box control GUI can also be provided to a monitoring site. For example, gas box control GUI 1000 can be provided to supervisory personnel.

A company logo GUI panel 1002 provides a visual reminder about the company providing the screen display. In the illustrated embodiment, GUI panel 1002 provides only the company logo. In alternate embodiments, panel 1002 can be dynamic and provide the operator with additional information when the operator selects GUI panel 1002. For example, GUI panel 1002 can provide contact information and/or version information.

Figure 11:
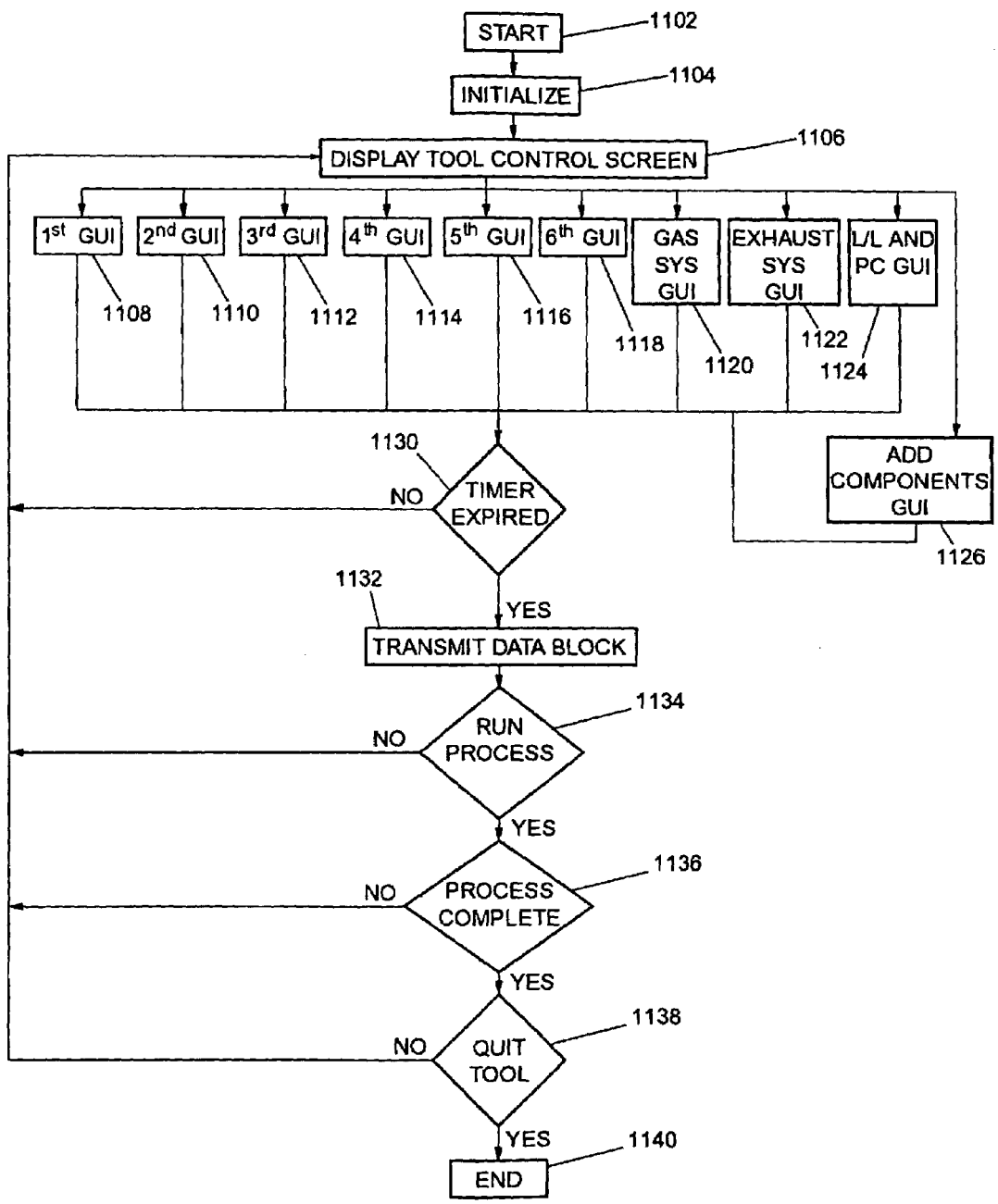
FIG. 11 illustrates a simplified flow diagram for a method of operating a tool man-machine interface (or MMI) in accordance with a preferred embodiment of the invention.

FIG. 11 illustrates a simplified flow diagram for a method of operating a tool MMI in accordance with a preferred embodiment of the invention. The method 1100 illustrated in FIG. 11 starts in step 1102. In step 1104, an initial set of values is determined for the tool control MMI. Desirably, a timer is set, and the Load/Lock (L/L) valve is initialized.

In step 1106, the tool control GUI screen is displayed, for example, the exemplary tool control GUI screen 200 that is illustrated in FIG. 2. The controller determines if additional input data has been received. Desirably, the controller processes any data blocks that have been received. For example, a data block can be received from the controller associated with a subsystem or from the external interface.

In step 1108, the first operational status GUI panel 210 (FIGS. 2 and 3) is processed. The MMI software displays a visual indication of the current operational status of a set of control elements and monitor elements associated with the first system component. The MMI software determines if the user has changed any of the data associated with the control elements for the first component and updates the data to send to the first component's controller accordingly. The MMI software determines if any of the data associated with the monitored parameters has changed and updates the displayed values accordingly.

In step 1110, the second operational status GUI panel 212 (FIGS. 2 and 4) is processed. The MMI software displays a visual indication of the current operational status of a set of control elements and monitor elements associated with a second system component. The MMI software determines if the user has changed any of the data associated with the control elements for the second component and updates the data to send to the second component's controller accordingly. The MMI software determines if any of the data associated with the monitored parameters has changed and updates the displayed values accordingly.

In step 1112, the third operational status GUI panel 214 (FIGS. 2 and 5) is processed. The MMI software displays a visual indication of the current operational status of a set of control elements and monitor elements associated with a third system component. The MMI software determines if the user has changed any of the data associated with the control elements for the third component and updates the data to send to the third component's controller accordingly. The MMI software determines if any of the data associated with the monitored parameters has changed and updates the displayed values accordingly.

In step 1114, the fourth operational status GUI panel 216 (FIGS. 2 and 6) is processed. The MMI software displays a visual indication of the current operational status of a set of control elements and monitor elements associated with a fourth system component. The MMI software determines if the user has changed any of the data associated with the control elements for the fourth component and updates the data to send to the fourth component's controller accordingly. The MMI software determines if any of the data associated with the monitored parameters has changed and updates the displayed values accordingly.

In step 1116, the fifth operational status GUI panel 218 (FIGS. 2 and 7) is processed. The MMI software displays a visual indication of the current operational status of a set of control elements and monitor elements associated with a fifth system component. The MMI software determines if the user has changed any of the data associated with the control elements for the fifth component and updates the data to send to the fifth component's controller accordingly. The MMI software determines if any of the data associated with the monitored parameters has changed and updates the displayed values accordingly.

In step 1118, the sixth operational status GUI panel 220 (FIGS. 2 and 8) is processed. The MMI software displays a visual indication of the current operational status of a set of control elements and monitor elements associated with a sixth system component. The MMI software determines if the user has changed any of the data associated with the control elements for the sixth component and updates the data to send to the sixth component's controller accordingly. The MMI software determines if any of the data associated with the monitored parameters has changed and updates the displayed values accordingly.

In step 1120, the control elements and the monitor elements associated with the gas supply system are processed. The MMI software displays a visual indication of the current operational status of the control elements and the monitor elements associated with the gas supply system. The MMI software determines if the user has changed any of the data associated with the control elements for the gas supply system and updates the data to send to that element's controller accordingly. The MMI software determines if any of the data associated with the monitoring parameters has changed and updates the displayed values accordingly. The MMI software also updates the message box displays for the gas supply system.

In step 1122, the control elements and the monitor elements associated with the exhaust system are processed. The MMI software displays a visual indication of the current operational status of the control elements and the monitor elements associated with the exhaust system. The MMI software determines if the user has changed any of the data associated with the control elements for the exhaust system and updates the data to send to that element's controller accordingly. The MMI software determines if any of the data associated with the monitoring parameters has changed and updates the displayed values accordingly. The MMI software also updates the message box displays for the exhaust system.

In step 1124, the control elements and the monitor elements associated with the load/lock chamber and process chamber are processed. The MMI software displays a visual indication of the current operational status of the control elements and the monitor elements associated with the load/lock chamber and process chamber. The MMI software determines if the user has changed any of the data associated with the control elements for the load/lock chamber and/or process chamber and updates the data to send to that element's controller accordingly. The MMI software determines if any of the data associated with the monitoring parameters has changed and updates the displayed values accordingly. The MMI software also updates the message box displays for the load/lock chamber and process chamber.

In step 1126, the control elements and the monitor elements associated with any additional components are processed. The MMI software displays a visual indication of the current operational status of the control elements and the monitor elements associated with the additional components. The MMI software determines if the user has changed any of the data associated with the control elements for the additional components and updates the data to send to that element's controller accordingly. The MMI software determines if any of the data associated with the monitoring parameters has changed and updates the displayed values accordingly. The MMI software also updates the message box displays for the additional components.

In step 1130, a query is performed to determine if the timer has expired. When the timer has expired, procedure 1100 branches to step 1132. When the timer has not expired, procedure 1100 branches to step 1106.

In step 1132, one or more data block is transmitted to one or more controllers. For example, a controller can be an embedded microcontroller associated with a subsystem and/or an external interface.

In step 1134, a query is performed to determine if a process should be run. When it is determined that the process should be run, the procedure 1100 branches to step 1136. When it is determined that the process should not be run, the procedure 1100 branches to step 1106. For example, a process can be performed by a subsystem and/or the external interface.

In step 1136, a query is performed to determine if the process has completed. When the process is completed, the procedure 1100 branches to step 1138. When the process is not completed, the procedure 1100 branches back to step 1106. Desirably, control data and monitor data can be displayed to a user during a process. For example, control data cannot be changed by a user during some processes, and some control data must be changed by the user during other processes.

In step 1138, a query is performed to determine if the MMI tool software should be stopped. When the MMI tool software should be stopped, procedure 1100 branches to step 1140. When the MMI tool software should not be stopped, procedure 1100 branches back to step 1106.

In step 1140, the procedure 1100 ends.

Figure 12:
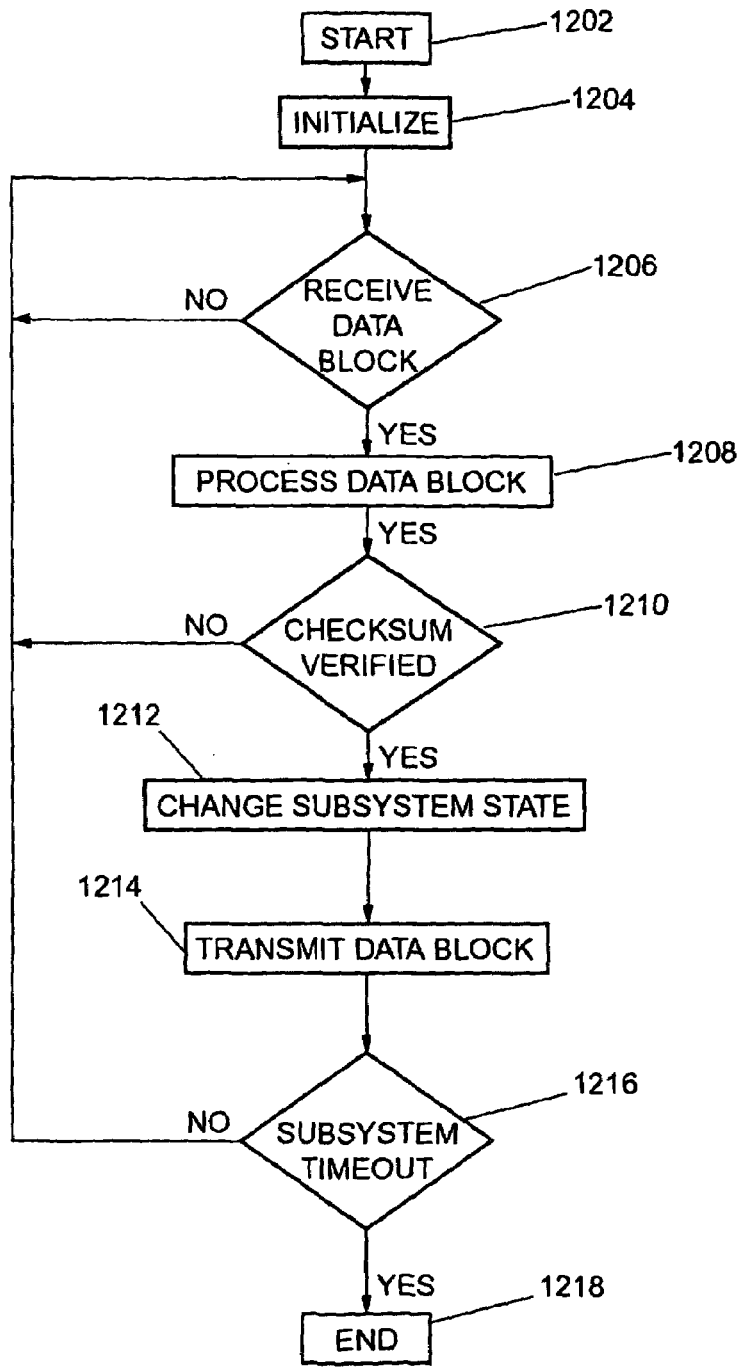
FIG. 12 illustrates a simplified flow diagram for a method of operating a subsystem (i.e. tool, gas box, or radio frequency generator) in accordance with a preferred embodiment of the invention.

FIG. 12 illustrates a simplified flow diagram for a method of operating a subsystem (i.e. tool, gas box, or RF generator) in accordance with a preferred embodiment of the invention. The method 1200 illustrated in FIG. 12 starts in step 1202. In step 1204, the controller is initialized. In a preferred embodiment, a timer is also set.

In step 1206, a query is performed to determine if a data block has been received. When a data block has been received, the procedure 1200 branches to step 1208. When a data block has not been received, the procedure 1200 branches back to step 1206. Desirably, the tool receives one or more data block from the MMI software. For example, the data block can include data required to change the state of an RF generator.

In step 1208, the controller associated with this subsystem processes the received data block and determines a checksum.

In step 1210, a query is performed to determine if the checksum is correct. When the checksum is determined to be correct, the procedure 1200 branches to step 1212. When the checksum is determined not to be correct, the procedure 1200 branches back to step 1206.

In step 1212, the subsystem state is changed using the information from the processed data block. For example, when the subsystem is the gas box, the controller associated with the gas box can determine what valves, if any, need to be changed. Similarly, when the subsystem is the tool, the controller associated with the tool can determine what changes, if any, are required for a high voltage power supply. Similarly, when the subsystem is an RF source, the controller associated with the RF source can determine what changes, if any, are required for an RF source.

In step 1214, the controller associated with this subsystem transmits one or more data block to the MMI software. The transmitted data block contains the current subsystem status for the MMI software to display.

In step 1216, a query is performed to determine if the timer has expired. When the timer has expired, the procedure 1200 branches to step 1218. When the timer has not expired, the procedure 1200 branches to step 1206.

In step 1218, the procedure 1200 ends. Desirably, the subsystem is stopped. For example, a RF source can be stopped by being shut-off or being put into a stand-by state.

Figure 13:
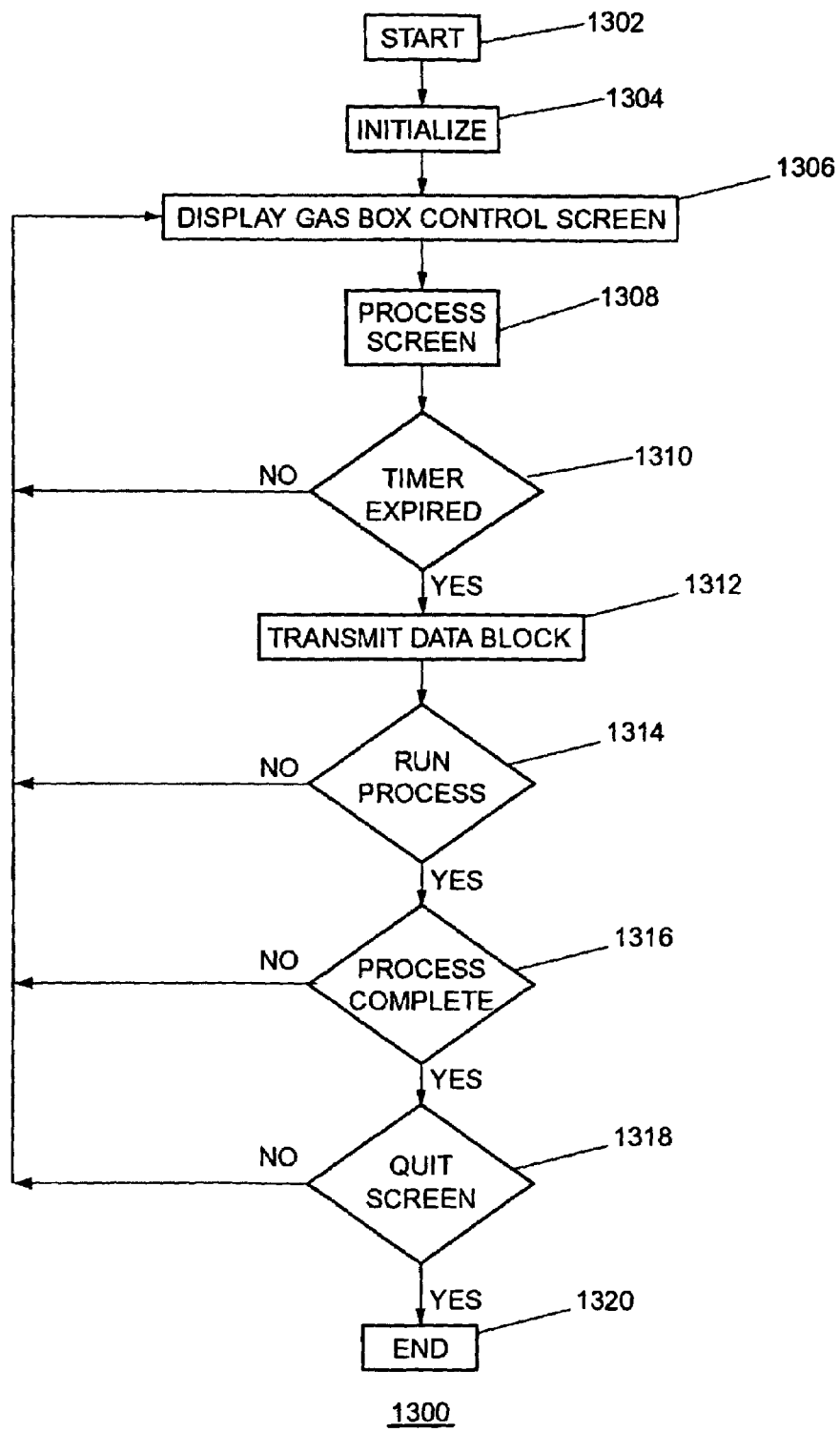
FIG. 13 illustrates a simplified flow diagram for a method of operating a gas box MMI in accordance with a preferred embodiment of the invention.

FIG. 13 illustrates a simplified flow diagram for a method of operating a gas box MMI in accordance with a preferred embodiment of the invention. The method 1300 starts in step 1302. In step 1304, an initial set of values is determined for the gas box control MMI. In a preferred embodiment, a timer is also set.

In step 1306, the gas box control GUI screen is displayed. An exemplary gas box control GUI screen 1000 is illustrated in FIG. 10. The controller determines if additional input data has been received. Desirably, the controller processes any data blocks that have been received. For example, a data block can be received from the controller associated with the gas box.

In step 1308, the control elements and the monitor elements associated with the gas box control screen are processed. The MMI software displays a visual indication of the current operational status of the control elements and the monitor elements associated with the gas box. The MMI software determines if the user has changed any of the data associated with the control elements for the gas box and updates the data to send to the gas box's controller accordingly. The MMI software determines if any of the data associated with the gas box's monitoring parameters has changed and updates the displayed values accordingly.

In addition, the MMI software also updates the process control display buttons for the processes associated with the gas box control screen. Desirably, the MMI software determines if the user has changed any of the data associated with the process control display buttons. In the illustrated embodiment, the process control display buttons 1010, 1012, 1014, 1016, and 1018 (FIG. 10) are labeled "Auto He," "Purge," "Process Setup," "Discharge Setup," and "Close All," respectively. A software driven process is initiated when one of these buttons is selected. For example, when the "Auto He" button 1010 is selected He is automatically provided to the backside of a wafer. In alternate embodiments, different software driven processes can be used. Desirably, the displayed state for each valve is updated, For example, valves are controlled to be in one of two states and their color indicates the state that they are currently in. Also, the manometer and MFC readings are updated. In addition, the pressure transducer and pressure control valve readings are updated.

In step 1310, a query is performed to determine if the timer has expired. When the timer has expired, the procedure 1300 branches to step 1312. When the timer has not expired, the procedure 1300 branches to step 1306.

In step 1312, one or more data block is transmitted to one or more controllers. For example, a controller can be an embedded microcontroller in the gas box.

In step 1314, a query is performed to determine if a process should be run. When it is determined that the process should be run, the procedure 1300 branches to step 1316. When it is determined that the process should not be run, the procedure 1300 branches to step 1306.

In step 1316, a query is performed to determine if the process has completed. When the process is completed, the procedure 1300 branches to step 1318. When the process is not completed, the procedure 1300 branches back to step 1306. Desirably, control data and monitor data can be displayed to a user during a process. For example, control data cannot be changed by a user during some processes, and some control data must be changed by the user during other processes.

In step 1318, a query is performed to determine if the MMI tool software should be stopped. When the MMI tool software should be stopped, the procedure 1300 branches to step 1320. When the MMI tool software should not be stopped, the procedure 1300 branches back to step 1306.

In step 1320, procedure 1300 ends. For example, the gas box control MMI screen can be closed by selecting the "quit" button 1004. Desirably, the MMI software displays the tool control screen 200 (FIG. 2).

The tool and gas box to be monitored is determined using input data from the user. For example, the user determines that the tool and the gas box to be monitored are in a research laboratory having a wide variety of processes to be monitored. The specific set of processes to be monitored and controlled are used to configure the tool and gas box MMI screens.

The present invention can be applied to a tool other than a plasma-processing tool. Additional advantages and modifications will readily occur to those skilled in the art.

The present invention advantageously provides a man-machine interface (MMI) for monitoring and controling a processing tool, such as a semiconductor processing tool. Graphical user interfaces (GUIs) are used for monitoring and controlling a current status of the tool. The MMI provides easily readable screens where the graphical display is organized so that the monitored data is logically presented to the user, control elements are clearly indicated to the user, and the user can efficiently review the data and change the control elements.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

The invention claimed is:

1. A process monitoring system for monitoring a plasma processing system, said process monitoring system comprising:
    a plurality of processing subsystems;
    a control system coupled to the plurality of processing subsystems, the control system being configured to receive monitor data from the plurality of processing subsystems and send control data to the plurality of processing subsystems;
    an external interface coupled to the control system, the external interface including a paging system, the paging system configured to provide control data to the control system; and
    a man-machine interface (MMI) coupled to the control system, the MMI being configured to display the monitor data, display the control data, and access the paging system.

2. The process monitoring system as recited in claim 1, wherein the control system includes a memory for storing the monitor data and the control data.

3. The process monitoring system as recited in claim 2, wherein the memory includes a structured query language server database.

4. The process monitoring system as recited in claim 1, wherein the external interface further comprises a dial-in system.

5. The process monitoring system as recited in claim 1, wherein the MMI comprises:
    a first control graphical user interface (GUI) screen including means for accessing the paging system; and
    a second GUI including a plurality of monitor and control elements, the control elements providing the control data and the monitor elements providing the monitor data.

6. The process monitoring system as recited in claim 5, wherein the first control GUI screen further comprises a plurality of operational status GUI panels, and wherein each of the plurality of operational status GUI panels provides a visual indication of current operational status of a set of control elements and monitor elements associated with a system component.

7. The process monitoring system as recited in claim 6, wherein the system component comprises a RF source.

8. The process monitoring system as recited in claim 5, wherein the second GUI further comprises a plurality of monitor and control elements associated with a gas supply system.

9. The process monitoring system as recited in claim 1, wherein the plurality of processing subsystems comprises a plasma processing subsystem and a gas supply subsystem coupled to the plasma processing subsystem.

10. The process monitoring system as recited in claim 1, wherein the MMI comprises a first GUI screen for controlling and monitoring at least one subsystem, and a second GUI screen for controlling and monitoring at least one subsystem.

11. The process monitoring system as recited in claim 10, wherein the first GUI screen comprises a plurality of operational status GUI panels, wherein each of the plurality of operational status GUI panels provides a visual indication of the current operational status of a set of control elements and monitor elements associated with a system component, the control elements providing the control data and the monitor elements providing the monitor data.

12. The process monitoring system as recited in claim 10, wherein the at least one subsystem controlled and monitored by the first GUI screen comprises a first subsystem that is a plasma etching tool and a second subsystem that is a gas supply system coupled to the plasma etching tool.

13. The process monitoring system as recited in claim 12, wherein the first GUI screen comprises a first operational status GUI panel providing a visual indication of current operational status of a set of control elements and monitor elements associated with the first subsystem, the control elements providing the control data and the monitor elements providing the monitor data.

14. The process monitoring system as recited in claim 13, wherein the first subsystem comprises a first RF subsystem including a lower electrode in the plasma etching tool and an RF source coupled to the lower electrode.

15. The process monitoring system as recited in claim 14, wherein the first GUI screen comprises a second operational status GUI panel providing a visual indication of current operational status of a set of control elements and monitor elements associated with a second RF subsystem, the control elements providing the control data and the monitor elements providing the monitor data.

16. The process monitoring system as recited in claim 15, wherein the second RF subsystem comprises a upper electrode in a plasma etching tool and a RF source coupled to the upper electrode.

17. The process monitoring system as recited in claim 15, wherein the first GUI screen comprises a third operational status GUI panel providing a visual indication of current operational status of a set of control elements and monitor elements associated with a third RF subsystem.

18. The process monitoring system as recited in claim 17, wherein the third RF subsystem comprises a RF coil coupled to the plasma etching tool and a RF source coupled to the RF coil.

19. The process monitoring system as recited in claim 12, wherein the first GUI screen comprises an operational status GUI panel providing a visual indication of current operational status of a set of control elements and monitor elements associated with a gate valve coupled to the plasma etching tool, the control elements providing the control data and the monitor elements providing the monitor data.

20. The process monitoring system as recited in claim 12, wherein the first GUI screen comprises an operational status GUI panel providing a visual indication of current operational status of a set of control elements and monitor elements associated with a high voltage power supply coupled to the plasma etching tool, the control elements providing the control data and the monitor elements providing the monitor data.

21. The process monitoring system as recited in claim 12, wherein the first GUI screen comprises an operational status GUI panel providing a visual indication of current operational status of a set of control elements and monitor elements associated with a substrate holder in the plasma etching tool, the control elements providing the control data and the monitor elements providing the monitor data.

22. The process monitoring system as recited in claim 12, wherein the first GUI screen comprises an operational status GUI panel providing a visual indication of current operational status of a set of control elements and monitor elements associated with the plasma etching tool, the control elements providing the control data and the monitor elements providing the monitor data.

23. The process monitoring system as recited in claim 12, wherein the second GUI screen comprises an operational status GUI panel providing a visual indication of current operational status of a set of control elements and monitor elements associated with the gas supply system, the control elements providing the control data and the monitor elements providing the monitor data.

24. The process monitoring system as recited in claim 23, wherein the second GUI screen comprises a schematic representation of the gas supply system.

25. A process monitoring system for monitoring a plasma processing system, said process monitoring system comprising:
a plurality of processing subsystems;
means for receiving monitor data from the plurality of processing subsystems and for sending control data to the plurality of processing subsystems;
an external interface coupled to the control system, the external interface including a paging system, the paging system configured to provide control data to the control system; and
means for displaying the monitor data and the control data, and for accessing the paging system.

26. A method of operating a process monitoring system for monitoring a plasma processing system, said method comprising the steps of:
configuring the plasma-processing system as a plurality of processing subsystems;
receiving, by a control system, monitor data from the plurality of processing subsystems;
sending, by the control system, control data to the plurality of processing subsystems;
providing an external interface coupled to the control system, the external interface receiving data from the control system and providing the received data to at least one external user and obtaining response data from the at least one external user and sending the response data to the control system, the external interface including a paging system; and
providing a man-machine interface (MMI) coupled to the control system, the MMI for displaying the monitor data, for displaying the control data, and for accessing the external interface.

27. The method as recited in claim 26, wherein said external interface further comprises a dial-in system.

28. A method of operating a man-machine interface (MMI) coupled to plasma processing system, the method comprising the steps of:
displaying a graphical user interface (GUI) screen, wherein the GUI screen comprises a plurality of operational status GUI panels, the plurality of operational status GUI panels providing a visual indication of a current operational status of a set of control elements and monitor elements associated with at least one system component, wherein the current operational status is determined using at least one receive data block; and
processing the plurality of operational status GUI panels, wherein the processing includes sending changed control data to at least one subsystem using at least one transmit data block.

29. The method as recited in claim 28, wherein the processing step further comprises the steps of:
determining if control data associated with an operational status GUI panel has changed, the control data providing a status of control elements for a component associated with the operational status GUI panel;
displaying a changed control data when the control data has changed;
determining if monitor data associated with an operational status GUI panel has changed, the monitor data providing a status of monitor elements for a component associated with the operational status GUI panel;
displaying a changed monitor data when the monitor data has changed;
running a process in the at least one subsystem; and
determining if the process has completed, the method branching to the displaying step when the process is not completed.

* * * * *